(12) United States Patent
Smith et al.

(10) Patent No.: US 10,384,290 B2
(45) Date of Patent: Aug. 20, 2019

(54) ENGINE DRIVEN POWER SUPPLIES WITH OUTPUT REDUCTION

(71) Applicant: Illinois Tool Works Inc., Glenview, IL (US)

(72) Inventors: Alan Frederic Smith, Fremont, WI (US); Richard Charles Joyce, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 456 days.

(21) Appl. No.: 15/236,584

(22) Filed: Aug. 15, 2016

(65) Prior Publication Data
US 2018/0043454 A1 Feb. 15, 2018

(51) Int. Cl.
B23K 9/095 (2006.01)
B23K 9/10 (2006.01)

(52) U.S. Cl.
CPC .......... *B23K 9/1043* (2013.01); *B23K 9/1006* (2013.01); *B23K 9/1062* (2013.01)

(58) Field of Classification Search
CPC ...... B23K 9/095; B23K 9/1006; B23K 1/043; B23K 9/1062
USPC ............................................ 219/133, 137 PS
See application file for complete search history.

(56) References Cited

U.S. PATENT DOCUMENTS

| | | | |
|---|---|---|---|
| 5,968,385 A | 10/1999 | Beeson et al. | |
| 6,121,691 A * | 9/2000 | Renner | B23K 9/1006 219/133 |
| 6,121,961 A | 9/2000 | Renner | |
| 6,348,743 B1 | 2/2002 | Sakasai | |
| 6,603,213 B1 | 8/2003 | Renner | |
| 6,812,584 B2 | 11/2004 | Renner | |
| 9,266,183 B2 | 2/2016 | DuVal et al. | |

(Continued)

OTHER PUBLICATIONS

Int'l Search Report and Written Opinion Appln No. PCT/US2017/043871 dated Nov. 24, 2017.
Unpublished U.S. Appl. No. 15/179,286, filed Jun. 10, 2016.

*Primary Examiner* — Brian W Jennison
(74) *Attorney, Agent, or Firm* — McAndrews, Held, & Malloy Ltd.

(57) ABSTRACT

Engine driven power supplies with output reduction are disclosed. An example engine-driven welding power supply for providing a welding-type output includes an engine, a generator mechanically linked to the engine, power conditioning circuitry, and a controller. The generator generates output power based on mechanical input from the engine. The power conditioning circuitry converts the output power from the generator to welding-type power based on a commanded welding-type output. The controller reduces a welding-type output of the power conditioning circuitry from the commanded welding-type output by an amount proportional to a difference between a speed of the engine and a commanded engine speed while monitoring the difference between the speed of the engine and the commanded engine speed, decreases the welding-type output until the difference between the speed of the engine and the commanded engine speed decreases, and increases the welding-type output as the difference between the speed of the engine and the commanded engine speed decreases until the welding-type output equals the commanded welding-type output.

19 Claims, 4 Drawing Sheets

(56) References Cited

U.S. PATENT DOCUMENTS

2014/0021180 A1\* 1/2014 Vogel ................... B23K 9/1043
219/130.1
2014/0027428 A1 1/2014 DuVal et al.

\* cited by examiner

ENGINE DRIVEN POWER SUPPLIES WITH OUTPUT REDUCTION

BACKGROUND

This disclosure relates generally to welding systems and, more particularly, to engine driven power supplies with output reduction.

An electronically controlled welding power source will attempt to deliver whatever output power the power source is commanded to deliver. If the engine does not have enough power to supply the commanded load, a fold back circuit reduces the load in an attempt to match the available engine power.

SUMMARY

Engine driven power supplies with output reduction are disclosed, substantially as illustrated by and described in connection with at least one of the figures, as set forth more completely in the claims.

DETAILED DESCRIPTION

Figure 1:
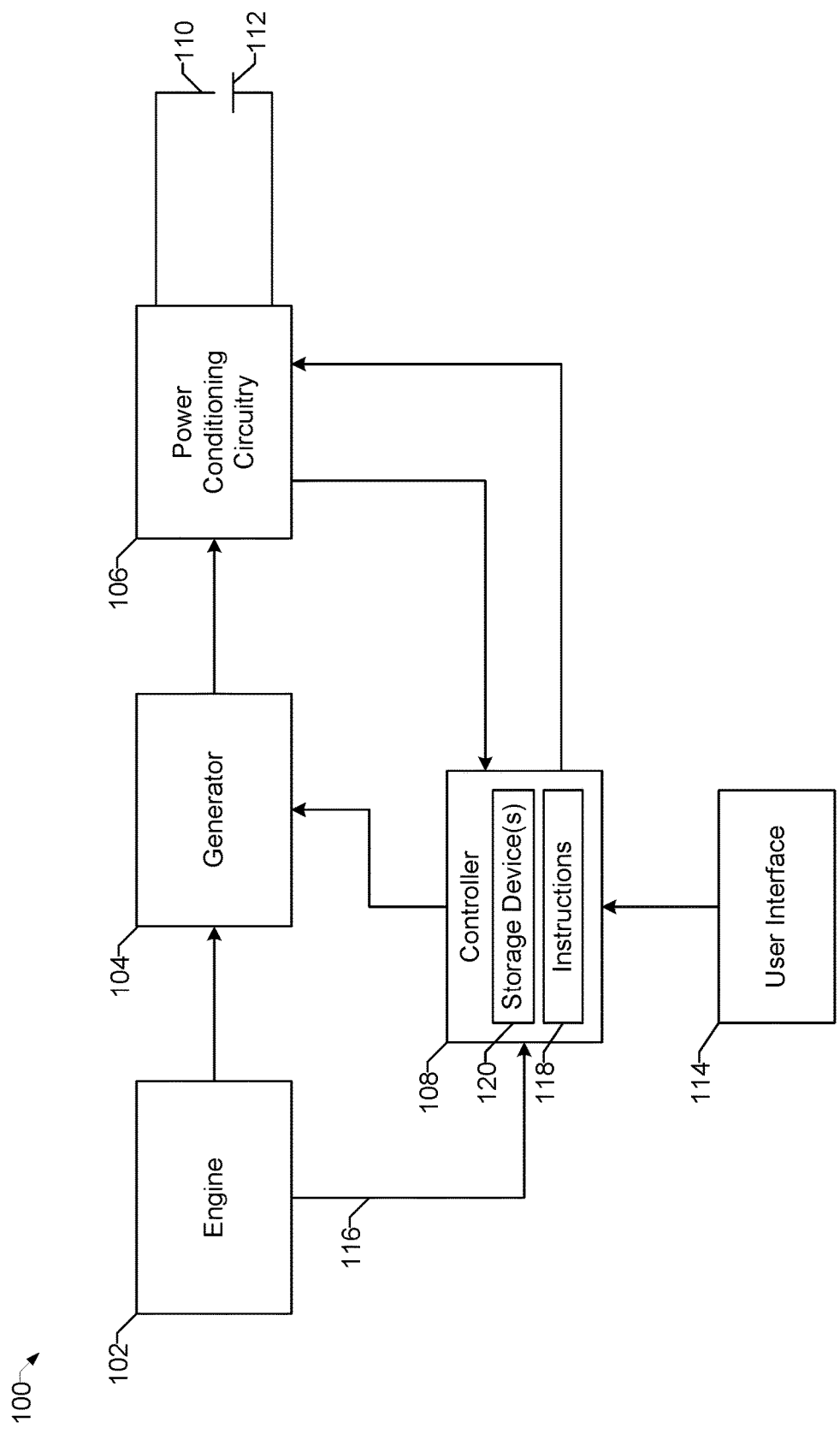
FIG. 1 is a schematic diagram of an example engine driven power supply implementing output reduction in accordance with aspects of this disclosure.

To avoid stalling, conventional engine-driven welders reduce an output command by an amount that is proportional to the amount that the engine speed (e.g., revolutions per minute, or RPM, of the engine) is below the normal operating speed. However, conventional engine-driven welders reduce the output by more than is actually necessary to allow the engine to accelerate up to rated speed. High reductions in output can cause welding issues for an operator, and particularly when the operator is attempting to start and establish a welding arc from an idle engine speed. In addition, different engines have different speed and/or torque characteristics, and one engine may be able to accelerate more or less under load than a different engine. Furthermore, engines with turbochargers have a different load pick-up characteristic than non-turbo engines. Operating conditions such as altitude, the condition of the fuel, and/or the conditions of air filters can also influence an engine response. Due to the variety of potential conditions, one set of values in an RPM fold back control scheme may not be appropriate for aa given combination of an engine and operating conditions, and some conditions are beyond an engine manufacturer's control.

Disclosed examples improve the adaptability of an engine to a load and operating conditions by only reducing an output command (relative to an output requested or programmed by an operator) by an amount that permits the engine to accelerate to the rated speed to support the load. Some examples start at a lower reduction in the output command and further reduce the output command until the engine reaches begins accelerating. By reducing the change in the output command, undesired effects on the work being performed by the operator is also reduced.

Disclosed examples are implemented in software executed by a controller, which that monitors engine speed (e.g., RPM) and generates a difference value or error value when an RPM is below the commanded operating engine speed. The different value is calculated as the RPM setpoint-measured engine RPM. Disclosed examples reduce the output command by an amount that is proportional to the difference value, but is also limited to a small reduction. The change in the difference value is monitored. If the difference value is reducing (e.g., the engine is accelerating) the command is not reduced any further. In some examples, when the engine reaches the commanded speed and is no longer accelerating, the system stops monitoring the change in the difference and only reduces the command by the amount proportional to the error. In some examples, monitoring the change in the difference and increasing the reduction in command is only used during engine acceleration. In some instances, the system may become unstable when continuing to adjust for a change in the difference when the engine reached the commanded speed.

If the difference value is not reducing (e.g., the engine does not have enough power to supply the commanded output), the command is further reduced, and the difference value is further monitored to determine if the error is decreasing. As a result, in some examples the output command is only reduced the minimum amount required to allow the engine to accelerate to rated speed.

Disclosed examples improve the stability of the welding arc when starting a weld from an idle engine condition. In contrast, conventional RPM foldback techniques are subject to reducing the output more than is required to permit the engine to accelerate and also causing the welding arc to snuff out, which is objectionable to the operator. In such a case, the engine RPM will then surge up as the load is removed, cause a reduction in the output command and, when the operator attempts to re-strike and establish a welding arc, cause the engine RPM to fall again and potentially cause the arc will snuff out again.

In some examples, when the engine driven welding power source is attempting to supply a high power load, such as during an arc gouging process, the power requirements may exceed the available engine power. As a result of exceeding the available engine power, example engine driven welding power sources continuously operate in the output foldback mode, where the welding-type output is reduced only so as to match the available engine power. In contrast, conventional engine driven welders may reduce the output beyond what is required to match the engine power, which can cause the output power and engine RPM to oscillate and destabilize the welding-type process, which is undesirable to the operator. Disclosed examples create more stable operating conditions than conventional techniques.

Conventional engine RPM foldback techniques may permit an engine to become effectively stuck at an RPM lower than the normal operating speed when coming up from idle. Disclosed examples prevent such sticking of the engine RPMs by monitoring the change in error. If the error is not changing, disclosed examples further reduce the welding-type output to permit the engine to accelerate.

Disclosed examples enable a dynamic RPM foldback technique that permits improvement over conventional techniques for different engines and/or different engine operating conditions. Thus, disclosed examples reduce or avoid the need to tune the foldback technique to a particular engine, which may not account for different sets of operating conditions.

The term "welding-type output," as used herein, refers to an output suitable for welding, plasma cutting, induction heating, CAC-A and/or hot wire welding/preheating (including laser welding and laser cladding).

FIG. 1 is a schematic diagram of an example engine driven power supply 100 implementing output reduction. The example engine driven power supply 100 includes an engine 102, a generator 104, power conditioning circuitry 106, and a controller (e.g., a control circuit) 108.

The engine 102 is mechanically coupled or linked to a rotor of the generator 104. The engine 102 is controllable to operate at multiple speeds, such as an idle (e.g., no or minimal load speed) and a maximum speed (e.g., the maximum rated power of the engine 102). The engine speed may be increased and/or decreased based on the load. The generator 104 generates output power based on the mechanical input from the engine 102.

The power conditioning circuitry 106 converts output power from the generator 104 to welding-type power based on a commanded welding-type output. The power conditioning circuitry 106 provides current at a desired voltage to an electrode 110 and a workpiece 112 to perform a welding-type operation. The power conditioning circuitry 106 may include, for example, a switched mode power supply or an inverter. Power conditioning circuitry may include a direct connection from a power circuit to the output (such as to the weld studs), and/or an indirect connection through power processing circuitry such as filters, converters, transformers, rectifiers, etc.

A user interface 114 enables selection of a commanded power level or welding-type output, such as a current or voltage level to be used for welding-type operations. The user interface 114 additionally or alternatively enables selection of one or more speeds for the engine 102 (e.g., in RPM), such as an idle engine speed and/or engine speed under load.

The controller 108 receives an engine speed input from the engine 102 or a sensor, and obtains the commanded engine speed and/or the commanded welding-type output from the user interface 114. When the controller 108 determines that a load on the welding-type output is causing the engine speed to drop or to fail to accelerate to match the load, the controller 108 reduces the welding-type output from the commanded welding-type output to enable the engine speed to increase.

In response to detecting a load or an increase in the load beyond the capacity of the engine 102, the controller 108 reduces the welding-type output of the power conditioning circuitry 106 from the commanded welding-type output by an amount proportional to a difference between the speed of the engine 102 and the commanded engine speed while monitoring the difference between the speed of the engine and the commanded engine speed. For example, if the engine 102 is at an idle speed when a load is added, the controller 108 decreases the welding-type output by a larger amount than if the engine decreases from the commanded speed due to an increased load on the engine. The controller 108 may monitor the difference between the speed of the engine and the commanded engine speed by comparing successive samples of the difference between the speed of the engine 102 (e.g., from RPM feedback 116) and the commanded engine speed to determine whether the difference is increasing, decreasing, or remaining the same.

When the controller 108 detects a condition to cause a decrease in the welding-type output, the controller 108 continues to decrease the welding-type output until the difference between the speed of the engine 102 and the commanded engine speed begins to decrease (e.g., when the engine 102 begins accelerating). As the different between the speed of the engine 102 and the commanded engine speed, the controller 108 increases the welding-type output as the until the welding-type output equals the commanded welding-type output.

The controller 108 controls the welding-type output by controlling the power conditioning circuitry 106 or by controlling a field current of the generator 104. For example, the controller 108 may decrease the welding-type output by decreasing at least one of a current output of the power conditioning circuitry 106 or a voltage output of the power conditioning circuitry 106. The controller 108 may control a switched mode power supply of the power conditioning circuitry 106 to reduce an output power and/or limit power consumed by the load connected to the power conditioning circuitry. Additionally or alternatively, the controller 108 may reduce the welding-type output by decreasing a magnitude of the field current in the generator 104 and/or increase the welding-type output by increasing the magnitude of the field current in the generator 104.

In some examples, the controller 108 decreases the welding-type output in response to determining that the initial reduction in the welding-type output (e.g., by the amount proportional to the difference between the speed of the engine and the commanded engine speed) does not result in an acceleration in the speed of the engine 102. The controller 108 may decrease the welding-type output by a first amount, determine whether the speed of the engine 102 has increased and, in response to determining that the speed of the engine 102 has not increased, decrease the welding-type output by a second amount. The controller 108 may continue to decrease the welding-type output and monitor to determine whether the decrease results in acceleration of the engine 102. In this manner, the controller 108 may be able to minimize a reduction in the welding-type output to a reduction necessary to enable the engine 102 to accelerate, which reduces the effect of the welding-type output reduction on the welding-type operation being performed.

In some examples, the controller holds the welding-type output while monitoring the difference between the speed of the engine 102 and the commanded engine speed for a threshold time duration prior to decreasing the welding-type output. The hold time may avoid affecting the welding-type operation in situations in which the engine 102 is capable of accelerating to the rated speed without assistance from the output control. Additionally or alternatively, the controller 108 may attempt to reduce the load or the welding-type output without direct control over the weld arc. As an example, the controller 108 may reduce a wire feed speed of a wire feeder that is part of a welding-type operation. The reduction in wire feed speed may be accomplished by communication between the controller 108 and the wire feeder, and can influence a weld operator to slow the welding travel speed and reduce the resulting welding load.

The controller 108 may include digital and/or analog circuitry, discrete or integrated circuitry, microprocessors, digital signal processors (DSPs), field programmable gate arrays (FPGAs), and/or any other type of logic circuits. The example controller 108 may be implemented using any combination of software, hardware, and/or firmware. The controller 108 executes machine readable instructions 118 which may be stored on one or more machine readable storage device(s) 120 such as volatile and/or non-volatile memory, hard drives, solid state storage, and the like.

Figure 2:
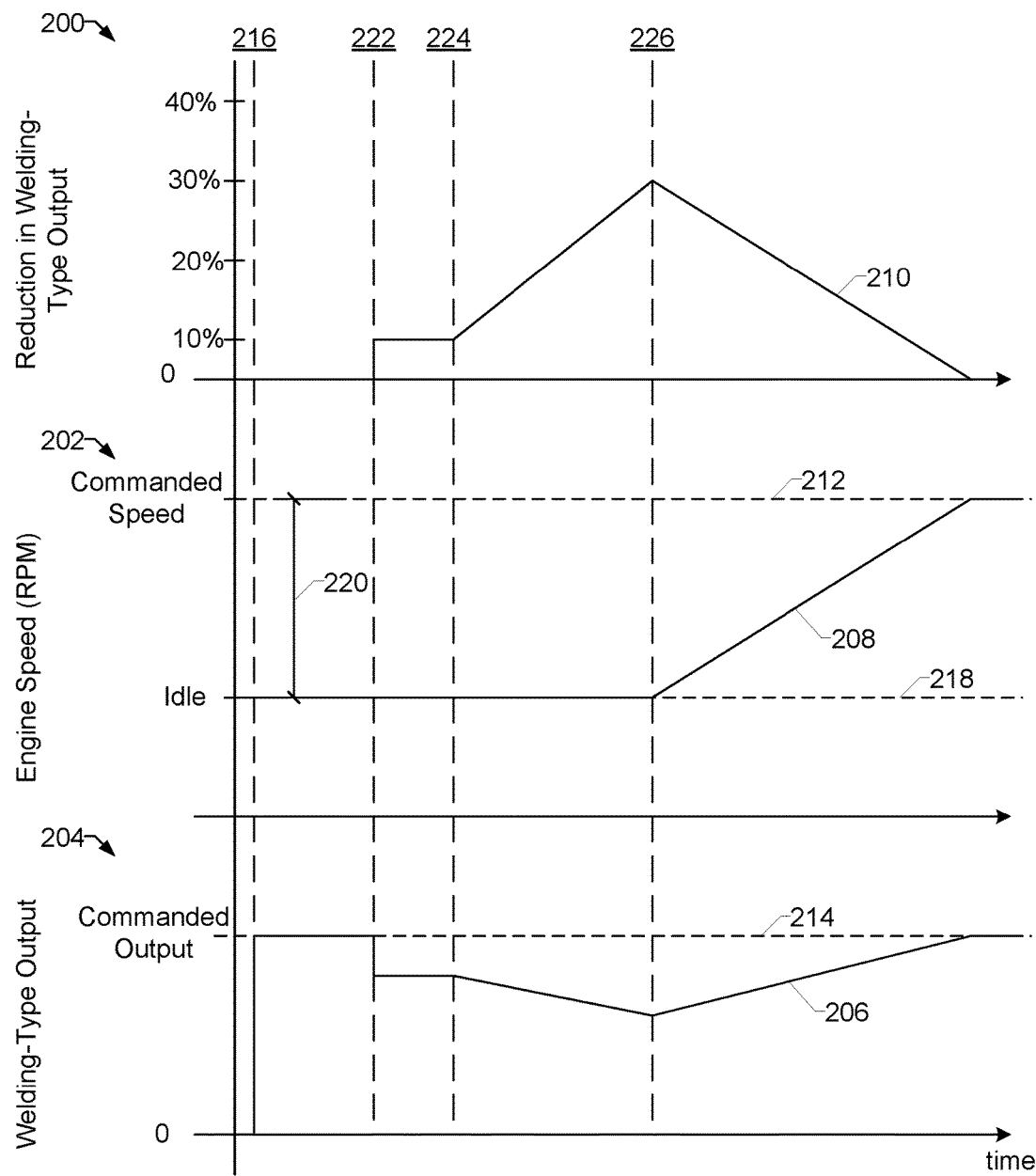
FIG. 2 shows corresponding graphs of a welding-type output, an engine speed, and a reduction in the commanded welding-type output for an example in which an operator attempts to perform a welding-type operation when the engine of FIG. 1 is at an idle speed.

FIG. 2 shows corresponding graphs 200, 202, 204 of a welding-type output 206, an engine speed 208, and a reduction in the commanded welding-type output 210 for an example in which an operator attempts to perform a welding-type operation when the engine 102 of FIG. 1 is at an idle speed. The graphs 202, 204 also illustrate a commanded engine speed 212 and a commanded welding-type output 214.

Prior to a first time 216 illustrated in the graphs 200, 202, 204, no welding-type output is being attempted by an operator (e.g., no welding-type operation is being performed). The engine 102 is operating an idle speed 218.

At the first time 216, the operator initiates a welding-type output by, for example, striking a welding arc. In response, the welding-type output from the power conditioning circuitry 106 of FIG. 1 increases as the load on the welding-type output increases. However, because the load is too high, the engine 102 is prevented from accelerating and, in some cases, may further decelerate. The controller 108 monitors a difference 220 between the engine speed 208 and the commanded engine speed 212.

Because the difference 220 between the engine speed 208 and the commanded engine speed 212 does not decrease after the first time 216, at a second time 222 the controller 108 reduces the welding-type output 206 by a first amount. As shown in the graphs 200, 204, the reduction 210 in the welding-type output corresponds to the decrease in the welding-type output 206. The controller 108 continues monitoring a difference 220 between the engine speed 208 and the commanded engine speed 212 by comparing successive samples of the engine speed 208 to the commanded engine speed 212.

Because the difference 220 between the engine speed 208 and the commanded engine speed 212 does not decrease after the second time 222, at a third time 224 the controller 108 further reduces the welding-type output 206 while monitoring the difference 220. In the example of FIG. 2, the controller 108 decreases the welding-type output 206 (e.g., increases the reduction 210) until a fourth time 226, at which the engine speed 208 begins to increase and the difference 220 between the engine speed 208 and the commanded engine speed 212 begins to decrease.

After the fourth time 226, the controller 108 increases the welding-type output 206 (e.g., decreases the reduction 210) as the difference 220 between the engine speed 208 and the commanded engine speed 212 decreases (e.g., as the engine speed 208 increases) until the welding-type output 206 equals the commanded welding-type output 214.

Figure 3:
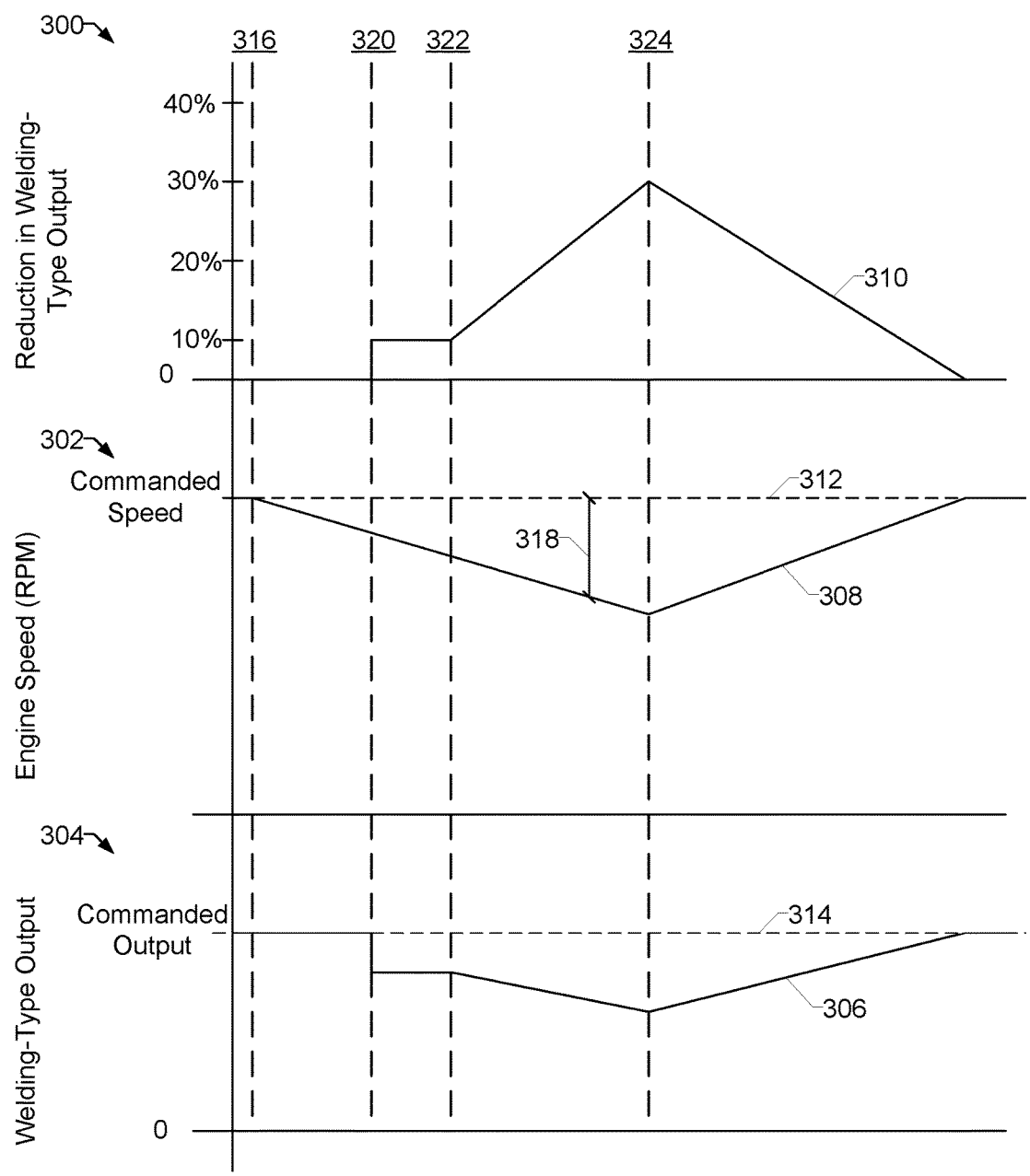
FIG. 3 shows corresponding graphs of a welding-type output, an engine speed, and a reduction in the commanded welding-type output for an example in which an operator attempts to perform a welding-type operation requiring more power than can be provided by the engine.

FIG. 3 shows corresponding graphs 300, 302, 304 of a welding-type output 306, an engine speed 308, and a reduction 310 in the commanded welding-type output for an example in which an operator attempts to perform a welding-type operation requiring more power than can be provided by the engine 102. The graphs 300, 302, 304 also illustrate a commanded engine speed 312 and a commanded welding-type output 314.

Prior to a first time 316, an operator is performing a welding-type operation that creates a load on the engine 102, and the engine 102 is operating at the commanded engine speed 312. At the first time 316, the load on the welding-type output 306 increases above a maximum load that can be sustained by the engine 102. As a result, the engine speed 308 begins to drop and a difference 318 between the engine speed 308 and the commanded engine speed 312 increases. The controller 108 monitors the difference 318 while waiting a time duration after the first time 316 until a second time 320.

Because the difference 318 between the engine speed 308 and the commanded engine speed 312 does not decrease after the first time 316, at a second time 320 the controller 108 reduces the welding-type output 306 by a first amount. As shown in the graphs 300, 304, the reduction 310 in the welding-type output corresponds to the decrease in the welding-type output 306. The controller 108 continues monitoring a difference 318 between the engine speed 308 and the commanded engine speed 312 by comparing successive samples of the engine speed 308 to the commanded engine speed 312.

Because the difference 318 between the engine speed 308 and the commanded engine speed 312 does not decrease after the second time 320, at a third time 322 the controller 108 further reduces the welding-type output 306 while monitoring the difference 220. In the example of FIG. 3, the controller 108 decreases the welding-type output 306 (e.g., increases the reduction 310) until a fourth time 324, at which the engine speed 308 begins to increase and the difference 318 between the engine speed 308 and the commanded engine speed 312 begins to decrease.

After the fourth time 324, the controller 108 increases the welding-type output 306 (e.g., decreases the reduction 310) as the difference 318 between the engine speed 308 and the commanded engine speed 312 decreases (e.g., as the engine speed 308 increases) until the welding-type output 306 equals the commanded welding-type output 314.

Figure 4:
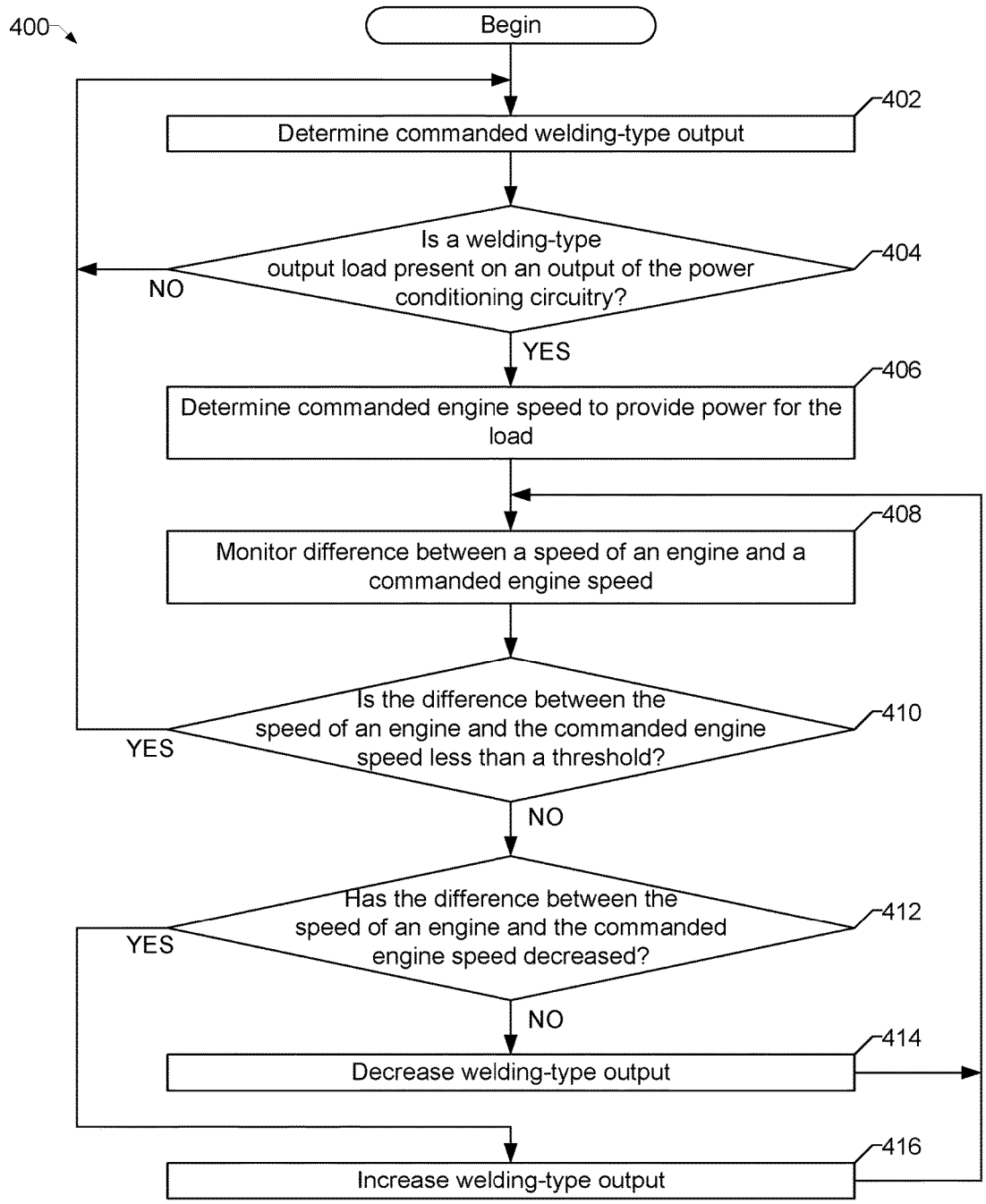
FIG. 4 is a flowchart representative of example machine readable instructions which may be executed to implement the controller of FIG. 1 to control a welding-type output.

FIG. 4 is a flowchart representative of example machine readable instructions 400 which may be executed to implement the controller 108 of FIG. 1 to control a welding-type output. The example instructions 400 of FIG. 4 may be executed to reduce the welding-type output of the power conditioning circuitry of FIG. 1 to permit the engine speed to increase to a commanded engine speed.

At block 402, the controller 108 determine a commanded welding-type output. For example, the controller 108 may receive a current or voltage selection via the user interface 114 of FIG. 1.

At block 404, the controller 108 determines whether a welding-type output load is present on an output of the power conditioning circuitry 106. For example, the controller 108 may receive measurement(s) of output current, output voltage, and/or output power from the power conditioning circuitry 106 or from one or more sensor(s). If no load is present (block 404), control returns to block 402.

When a welding-type output load is present on an output of the power conditioning circuitry 106 (block 404), at block 406 the controller 108 determines a commanded engine speed to provide the power for the load. For example, the commanded engine speed may be set by the user interface 114 and/or calculated based on the requirements of the load.

At block 408, the controller 108 monitors a difference between a speed of the engine 102 (e.g., in RPM) and the commanded engine speed (in RPM). For example, the controller 108 may monitor the differences 220 or 318 in the examples of FIGS. 2 and 3.

At block 410, the controller 108 determines whether the difference between the speed of the engine 102 and the commanded engine speed is less than a threshold. The threshold may represent an engine speed that is not likely to result in stalling of the engine 102. If the difference between the speed of the engine 102 and the commanded engine speed is less than the threshold (block 410), control returns to block 402).

If the difference between the speed of the engine 102 and the commanded engine speed is at least the threshold different (block 410), at block 412 the controller 108 determines whether the difference between the speed of the engine 102 and the commanded engine speed decreased.

If the difference between the speed of the engine 102 and the commanded engine speed has not decreased (block 412), at block 414 the controller 108 controls the power conditioning circuitry 106 and/or the generator 104 to decrease the welding-type output. On the other hand, if the difference between the speed of the engine 102 and the commanded engine speed has decreased (block 412), at block 416 the controller 108 controls the power conditioning circuitry 106 and/or the generator 104 to increase the welding-type output. After increasing the welding-type output (block 416) or decreasing the welding-type output (block 414), control returns to block 408. When the engine speed increases to reach the commanded speed and is no longer accelerating after increasing at block 416 (e.g., the difference is less than the threshold at block 410), the controller 108 stops monitoring the change in the difference to avoid instability in the system. When the controller 108 again identifies that the difference is at least the threshold difference at block 410, the controller 108 may then monitor the change in the difference at block 412.

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be an processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. An engine-driven welding power supply for providing a welding-type output comprising:
   an engine;
   a generator, mechanically linked to the engine, and configured to generate output power based on mechanical input from the engine;
   power conditioning circuitry to convert the output power from the generator to welding-type power based on a commanded welding-type output; and
   a controller comprising circuitry configured to, in response to determining that a difference between a speed of the engine and a commanded engine speed satisfies a threshold difference:
      reduce a welding-type output of the power conditioning circuitry from the commanded welding-type output by an amount proportional to a difference between a speed of the engine and a commanded engine speed while monitoring the difference between the speed of the engine and the commanded engine speed;
      decrease the welding-type output until the difference between the speed of the engine and the commanded engine speed decreases; and
      increase the welding-type output as the difference between the speed of the engine and the commanded engine speed decreases until the welding-type output equals the commanded welding-type output.

2. The engine-driven welding power supply as defined in claim 1, wherein the controller is configured to reduce the welding-type output by the amount proportional to the difference between the speed of the engine and the commanded engine speed in response to detecting that a load is present on the welding-type output or in response to detecting an increase in the load present on the welding-type output.

3. An engine-driven welding power supply for providing a welding-type output comprising:
   an engine;
   a generator, mechanically linked to the engine, and configured to generate output power based on mechanical input from the engine;
   power conditioning circuitry to convert the output power from the generator to welding-type power based on a commanded welding-type output; and
   a controller comprising circuitry configured to:
      reduce a welding-type output of the power conditioning circuitry from the commanded welding-type output by an amount proportional to a difference between a speed of the engine and a commanded engine speed while monitoring the difference between the speed of the engine and the commanded engine speed;
      decrease the welding-type output until the difference between the speed of the engine and the commanded engine speed decreases; and
      increase the welding-type output as the difference between the speed of the engine and the commanded engine speed decreases until the welding-type output equals the commanded welding-type output,
      wherein the controller is configured to hold the welding-type output while monitoring the difference between the speed of the engine and the commanded engine speed for a threshold time duration prior to decreasing the welding-type output.

4. The engine-driven welding power supply as defined in claim 1, wherein the generator comprises a field winding having a field current, the welding-type output is responsive to the field current, and the controller is configured to control the field current.

5. The engine-driven welding power supply as defined in claim 4, wherein the controller is configured to reduce the welding-type output by decreasing a magnitude of the field current and is configured to increase the welding-type output by increasing the magnitude of the field current.

6. The engine-driven welding power supply as defined in claim 1, wherein the power conditioning circuitry comprises a switched mode power supply, the controller configured to reduce the welding-type output by controlling the switched mode power supply to reduce the output power.

7. The engine-driven welding power supply as defined in claim 1, wherein the controller is configured to reduce the welding-type output by limiting power consumed by a load connected to the power conditioning circuitry.

8. The engine-driven welding power supply as defined in claim 1, wherein the controller is configured to monitor the difference between the speed of the engine and the commanded engine speed by comparing successive samples of the difference between the speed of the engine and the commanded engine speed to determine whether the difference is increasing, decreasing, or remaining the same.

9. The engine-driven welding power supply as defined in claim 1, wherein the controller is configured to minimize a reduction in the welding-type output to a reduction necessary to enable the engine to accelerate.

10. The engine-driven welding power supply as defined in claim 1, wherein the controller is configured to decrease the welding-type output in response to determining that the reduction in the welding-type output by the amount proportional to the difference between the speed of the engine and the commanded engine speed does not result in an acceleration in the engine speed.

11. The engine-driven welding power supply as defined in claim 10, wherein the controller is configured to decrease the welding-type output by a first amount, determine whether the speed of the engine has increased and, in response to determining that the speed of the engine has not increased, decrease the welding-type output by a second amount.

12. The engine-driven welding power supply as defined in claim 1, wherein the controller is configured to decrease the welding-type output by decreasing at least one of a current output of the power conditioning circuitry or a voltage output of the power conditioning circuitry.

13. A non-transitory machine readable storage medium comprising machine readable instructions which, when executed, cause a control circuit of an engine-driven welding power supply to:

monitor a difference between a speed of an engine and a commanded engine speed;

detect a load applied to power conditioning circuitry powered by the engine and a generator that is mechanically linked to the engine;

in response to detecting the load, reduce a welding-type output of the power conditioning circuitry from a commanded welding-type output by an amount proportional to the difference between the speed of the engine and the commanded engine speed;

decrease the welding-type output until the difference between the speed of the engine and the commanded engine speed decreases; and increase the welding-type output as the difference between the speed of the engine and the commanded engine speed decreases until the welding-type output equals the commanded welding-type output, wherein the instructions cause the control circuit to hold the welding-type output while monitoring the difference between the speed of the engine and the commanded engine speed for a threshold time duration prior to decreasing the welding-type output.

14. The non-transitory machine readable storage medium as defined in claim 13, wherein the instructions cause the control circuit to reduce the welding-type output by the amount proportional to the difference between the speed of the engine and the commanded engine speed in response to detecting that the load is present on the welding-type output.

15. The non-transitory machine readable storage medium as defined in claim 13, wherein the instructions cause the control circuit to control a field current of a field winding in the generator, the welding-type output being responsive to the field current.

16. The non-transitory machine readable storage medium as defined in claim 15, wherein the instructions cause the control circuit to reduce the welding-type output by controlling the generator to decrease a magnitude of the field current.

17. The non-transitory machine readable storage medium as defined in claim 15, wherein the instructions cause the control circuit to increase the welding-type output by controlling the generator to increase a magnitude of the field current.

18. The non-transitory machine readable storage medium as defined in claim 13, wherein the power conditioning circuitry comprises a switched mode power supply, and the instructions cause the control circuit to reduce the welding-type output by controlling the switched mode power supply to reduce an output power.

19. The non-transitory machine readable storage medium as defined in claim 13, wherein the instructions cause the control circuit to reduce the welding-type output by limiting power consumed by the load connected to the power conditioning circuitry.

* * * * *